United States Patent [19]

Dederer et al.

[11] 4,229,637
[45] Oct. 21, 1980

[54] SPOT WELDING ASSEMBLY FOR ELECTRICAL RESISTANCE WELDING

[75] Inventors: Günter Dederer, Germering; Helmut Müerkl, Munich, both of Fed. Rep. of Germany

[73] Assignee: Siemens Aktiengesellschaft, Berlin & Munich, Fed. Rep. of Germany

[21] Appl. No.: 933,413

[22] Filed: Aug. 14, 1978

[30] Foreign Application Priority Data

Aug. 29, 1977 [DE] Fed. Rep. of Germany ....... 2738854

[51] Int. Cl.³ .............................................. B23K 11/10
[52] U.S. Cl. .......................... 219/86.25; 219/86.51; 219/86.8; 219/87; 219/91.1
[58] Field of Search ............... 219/86.1, 86.25, 86.8, 219/87, 91.1, 86.51

[56] References Cited

U.S. PATENT DOCUMENTS

| | | | |
|---|---|---|---|
| 3,036,199 | 5/1962 | Page | 219/86.25 |
| 3,462,578 | 8/1969 | Schmick | 219/91.1 |

FOREIGN PATENT DOCUMENTS 155346  7/1953  Sweden ................... 219/86.1

Primary Examiner—E. A. Goldberg
Attorney, Agent, or Firm—Hill, Van Santen, Steadman, Chiara & Simpson

[57] ABSTRACT

A spot welding assembly is disclosed particularly adopted for precision welding of small components. The welding rod is carried at an outer side of the entire assembly in a clamp portion of an electrode slide block. The electrode slide block is in turn slidably carried in a feeder slide block which is in turn slidably carried by a carrier fixture. An adjustable spring bias is provided between the feed slide block and the electrode slide block.

11 Claims, 3 Drawing Figures

SPOT WELDING ASSEMBLY FOR ELECTRICAL RESISTANCE WELDING

BACKGROUND OF THE INVENTION

1. Field of the Invention

This invention relates to welding assemblies and in particular to a spot welding assembly for electrical resistance welding and particularly for precision welding of small components. The assembly consists of a carrier fixture which guides a feed slide block and an electrode slide block carrying the welding rod, the electrode slide block being spring loaded and being guided by ball bearings within the feed slide block.

2. Prior Art

In precision spot welding it is essential to guide the welding rod into contact with the work piece with an exactly controlled contact pressure. Moreover it is particularly important to avoid the generation of any torsion moment when pressing the electrode against the work piece. Any such torsional moment could, in some cases, result in an offset movement of the electrode tip at the welding point. Any offset, including a small rotation of the electrode tip, during pressure contact of the work piece, can result in damage to the work piece. For example, it is possible that during triggering of the electrical current welding pulse, that the heating of the parts to be welded at the welding location can be non-uniform due to a change in the contact cross section of the contacting welding rod. Moreover it is always possible that such movement of the rod or rod tip during the application of the pressure contact could cause a slight movement of the work pieces with respect to one another.

In order to avoid these problems, it is desired to construct the welding assembly in such a manner that the welding tip is precisely movable, is not subjected to undesired movement and is precisely applied to the work piece with the desired pressure.

SUMMARY OF THE INVENTION

It is therefore the primary object of this invention to meet the above requirements and to develop a spot welding assembly for precision welding which will not have any of the above described problems associated therewith. Further, one of the objects of this invention is to fix, by structural means, the electrode in its associated slide block in such a fashion that it is possible to apply several welding spots in a nearly continuous line, side by side on the work piece by using a plurality of closely spaced welding assemblies.

It is an additional object of this invention to provide a welding assembly fixture which is attachable as a building block item to automated production equipment but which is, by means of a few manual adjustments, easily switched from pneumatic, hydraulic, or electrical operation to manual operation.

It is another specific object of this invention to provide a spot welding assembly wherein the electrode contact pressure is quickly and easily adjustable from the exterior.

These objects have been accomplished according to this invention by: (a) designing the electrode slide block to form a welding rod clamp; (b) mounting a spring for generation of the electrode contact pressure on supports in the electrode slide block in such a manner that adjustments are possible from exterior of the electrode slide block; and (c) mounting the electrode slide block in the feed slide block and the feed slide block in the carrier fixture through ball bearing guide supports.

By providing that the actual electrode rods are clamped in the electrode slide block in such a manner that the slide block itself is the electrode holder, torsion generated during the contact between the electrode and the work piece will not be transferred to movement between the electrode slide block and the electrode. In this manner such torsion transfer is eliminated. Moreover, the spring used to exert pressure to the electrode is also positioned in the electrode slide block such that transfer of torsion between the action force and reaction force will be maintained as small as possible, if not eliminated to the end that the electrode rod will not torsionally move with respect to the electrode slide block.

Moreover, in order to transfer the contact force generated by the spring in as friction free manner as possible, both of the slide blocks are guided by ball bearing rall assemblies. In this manner the spring force is applied to the electrode and therethrough to the work piece in a manner which does not generate adverse moment arms. Given a predetermined stroke of the feed slide block and a preadjusted spring pressure, it is possible to precisely control the contact pressure between the electrode and the work piece. In order to allow for variations thereof, this invention teaches easy replaceability of the spring.

It is advantageous to preload the spring which is to be used to exert force against the electrode. The preload can be by means of an adjustment rod which acts through a ball bearing support at one end of the spring. The use of such a ball bearing support avoids distortion of the spring in the direction of applied torsion during adjustment. The adjusting rod is preferably accessible from the outside and has a dial head attached to it which cooperates with a scale member attached to the feed slide block.

In order to adequately seat the spring while making it easily replacable, the electrode slide block has an open ended bore on the side opposite the projection of the electrode with the spring received in the bore. The compression spring is therefore easily replaced and can be exchanged for springs having differing spring characteristics. Correspondingly the scale carrying portion of the feed slide block may also be exchangable. Therefore, it is possible, by relatively simple mens, to change the assembly from one contact pressure range to another.

In order to provide an ability for assemblies of this type to be used in close proximity to one another, an axial vertex edge of the welding electrode is positioned outside of the clamp of the electrode slide block. The vertex edge can thus move in a plane parallel to the stroke plane and constitute the outermost side of the assembly. Thus, in this manner, by using two similar but side reversed assemblies, the electrodes can be guided against the work piece immediately adjacent to one another such that the welding spots will almost touch one another.

In the preferred embodiment illustrated, in the upper part of the feed slide block a circular cavity is provided which can be covered by a cover plate or clip. A toggle link or power rod can be positioned in the cavity. The cover plate is removable so that a drive rod which is part of a pneumatic, hydraulic or manually operated system can be attached in the cavity. By this means, it is simple to dis-attach an automatic feed system and attach a manual feed system in its place.

Other objects, features and advantages of the invention will be readily apparent from the following description of the preferred embodiments thereof, taken in conjunction with the accompanying drawings, although variations and modifications may be effected without departing from the spirit and scope of the novel concepts of the disclosure, and in which:

BRIEF DESCRIPTIONS OF THE DRAWINGS

DESCRIPTION OF THE PREFERRED EMBODIMENTS

Figure 1:
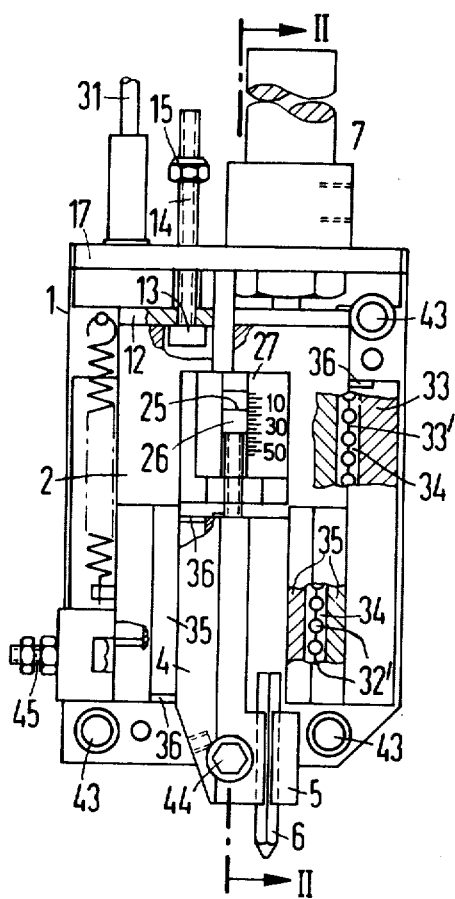
FIG. 1 is a side plan view, partially in section with a protective cover removed, of a spot welding assembly according to this invention.

As shown in FIG. 1, the assembly consists of a base carrier fixture 1 to which a feed slide block 2 is bearing mounted in such a way that the feed slide block can be moved up and down or vertically in the attitude illustrated in FIG. 1. Inside the feed slide block, an electrode block 4 is guided for vertical movement through a bearing support. The electrode slide block includes a clamp 5 for attaching a welding rod 6.

In the illustrated embodiment, the assembly is activated through an activation mechanism 7 which may, for example, consist of a pneumatic or hydraulic cylinder piston having a piston rod 8 which terminates in a head 9 received in a recess 10 of the feed slide block 2. A cover plate 11 may be fastened by means of screws or the like to the top surface of the feed slide block closing the recess 10 in such a manner that the head 9 is entrapped in the recess.

Figure 2:
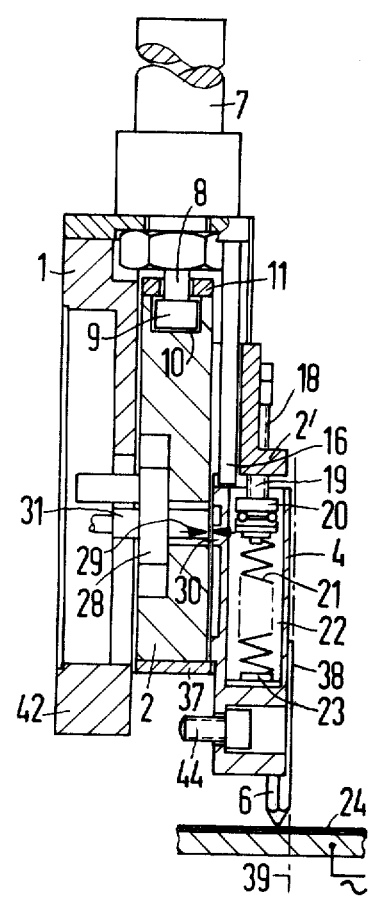
FIG. 2 is a sectional view taken along the lines II—II of FIG. 1.

An addtional recess in the top face of the feed slide block may also be provided which has received therein the end of a screw bolt 13 which has a projecting threaded stem 14 around which is received an adjustable nut 15. In this manner the stroke height movement of the piston rod 8 can be adjusted so as to limit the movement of the feed slide block. A positioning pin 16, best illustrated in FIG. 2, can be carried within the cover plate 17 of the base carrier fixture 1 and can function as an upper stop limiter for movement of the electrode slide 4.

A pressure assembly acts between the feed slide block and the electrode slide block and includes an adjustment rod 18 which is threaded in the manner of a bolt. At the end 19 of the adjustment rod a ball bearing assembly 20 is mounted which is acted against by spring 21. The spring 21 is mounted in bore 22 of the electrode slide block and is bottomed therein against disk 23.

Movement of the electrode 6 against the work piece 24 is accomplished by means of movement of the feed slide block through the pressure spring 21 which controls pressure of contact. The adjustment rod 18 carries head 26 which is equipped with a measuring mark 25 which works in conjunction with rulings on a scale 27 attached to the feed slide block 2. The desired contact pressure can be adjusted by means of the adjustment rod 18 such that the pressure exerted by the spring 21 to supply contact pressure between the electrode welding rod 6 and the work piece 24 will be consistent given the control of movement of the feed slide as explained above.

A proximity type switch 28 may be positioned interior of the feed slide block in a manner such that its sensor 29 is activated whenever a switch activator 30 connected to the electrode slide block is opposite the sensor 29. Upon activation of the switch 28, a signal through line 31 triggers a welding current input to the welding rod. The signal lines may be guided by means of a plug and socket connection through the cover plate 17 of the fixture 1.

As shown in FIG. 1, the electrode slide block is received in the feed block, and the feed block is received in the carrier 1 in ball bearing slide guides 32, 33. As is known in this type of a ball bearing guide rail assembly, the bearings are received in recesses 34. Given a predetermined stroke height, the distance traveled by the corresponding cages 32' and 33' is only one half the stroke height. However due to inertia of the cages, it is possible that they may overshoot that distance by a small amount. In order for the cages the ball bearing assemblies to be returned each time to their original position, ball bearing slides 35 of the electrode slide block 4 are equipped with a stop plate 36 which, during a return stroke, initiated by positioning pin 16, returns the cages of the ball bearings. A corresponding stop plate 37 is mounted on the feed slide block 2.

The welding rod 6 is preferably attached in such a way to the clamp 5 of the electrode slide block that its outermost edge of in the case of a round rod, its outer diameter surface portion, 38 will move in stroke plane 39 of the assembly which edge movement then corresponds to the outer most projection of the overall assembly on that side of the assembly.

Figure 3:
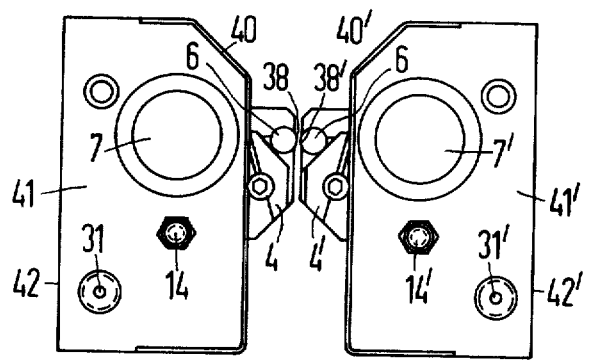
FIG. 3 is a top plan view of two assemblies similar to the assembly of FIG. 1, positioned in side by side relation.

In this manner, as shown in FIG. 3, two spot welding assemblies which are identical by mirror images to one another can be positioned immediately adjacent one another. In the illustration of FIG. 3, each of the assembly is equipped with a cover plate 40, 40'. It can be seen that the welding assemblies 41 and 41' can be positioned so closely adjacent that their vertex edges 38, 38' of the respective welding electrode 6, 6' are nearly touching. This makes it possible to place two weld locations so close to each other that the welding spots touch, or possibly overlap.

Where it is desired to change the welding apparatus to manual operation, all that is necessary is to remove the cover plate 17 and the plate 11. Thereafter, instead of the cylinder rod 8, a similar formed rod connected to a manual activation system can be inserted into the recess 10. The cover and cover plate can then be reassembled. With this simple modification the device can be changed from hydraulic, pneumatic, or other automatic operation to a manual operation.

The assembly is easily attachable to other supports or machine parts and to this end, the base carrier 1 has a flat back or plane 42 through which bolt holes 43 for mounting of the assembly are provided.

Electrical current for the welding electrode can be supplied through a stress relieved welding cable mounted by means of a cable shoe 45 shown in FIG. 1 to a clamping screw 34 on the electrode slide block so that the entire electrode slide block is then energized. Preferably the feed and slide blocks are constructed of high strength light metal products such as aluminum. The contact parts, preferably the entire electrode slide block, may be electro-chemically plated with a high conductive material such as, for example, a layer of gold.

It can therefore be seen from the above that this invention provides a novel spot welding assembly consisting of a base member which supports, through bearing slides, a moveable feed slide which in turn, supports, through bearing slides, a moveable electrode slide. The electrode slide terminates in an electrode rod clamp. A spring positioned between the electrode slide and the feed slide is adjustable to provide a given contact pressure for a given stroke length of the feed slide. An adjustment bolt has one end bottom through a bearing assembly on a spring which in turn is bottomed in a blind bore in the electrode slide block. The adjustment bolt is received through a threaded bore in the feed slide and terminates in an adjustment head accessible from the exterior of the assembly which carries an adjustment bar which is linable according to a scale carried by the feed slide.

Although the teachings of our invention have herein been discussed with reference to specific theories and embodiments, it is to be understood that these are by way of illustration only and that others may wish to utilize my invention in different designs or applications.

We claim as our invention:

1. A first spot welding assembly for electrical resistance welding comprising: a base carrier fixture, a feed slide block linearly movably carried by said base, ball bearing slides interposed between the feed slide block and said base, an electrode slide block linearly movably carried by the feed slide block, ball bearing slides interposed between the feed slide block and the electrode slide block, spring means between the feed slide block and electrode slide block biasing the electrode slide block linearly of the feed slide block, the electrode slide block terminating in a welding electrode clamp, adjusting means accessible from the exterior of the electrode slide block for adjusting a biasing face of the spring means.

2. An assembly according to claim 1 wherein the adjusting means comprises an adjustment rod carried by the feed slide block, the adjustment rod terminating in a ball bearing support, the ball bearing support engaging an axial end of the spring means, the adjusting rod being movable with respect to the feed slide block.

3. An assembly according to claim 1 wherein a welding rod having an outer surface portion is attached to the clamp with the portion positioned exteriorly of the clamp forming an outermost edge of the overall assembly.

4. An assembly according to claim 1 wherein the base carrier has a flat planer side for attachment to a machinery mount opposite an electrode received in the clamp.

5. A first spot welding assembly accordng to claim 3 including a second spot welding assembly, the second spot welding assembly being mirror image of the first spot welding assembly in the placement of the electrode slide block and electrode clamp, the spot welding assemblies being positioned opposite one another with electrodes received in the electrode clamps being closely adjacent one another.

6. A spot welding assembly according to claim 1 wherein the electrode slide block has a top surface, a blind bore extending into said slide block from said top surface, said spring means being a compression spring received in said bore and bottomed therein, said compression spring biasing said block linearly of said feed block.

7. A welding assembly according to claim 6 wherein an adjustment rod assembly is carried in threaded engagement by said feed block, the adjustment rod assembly bottoming against a tip of the compression spring, the adjustment rod assembly having a head thereon remote from the spring, the head having a marker thereon, the marker positional in juxtaposition to a scale carried by the feed block, the scale being removable therefrom, said adjusting means including the adjustment rod assembly.

8. A spot welding assembly according to claim 1 wherein the feed slide block has a top cover plate, means for moving the feed slide block including a moving rod, the moving rod affixed to the feed slide block by means of said cover plate, removal of the cover plate allowing withdrawl of the rod.

9. A spot welding assembly according to claim 1 including a proximity switch carried by the feed slide block, an activator for said proximity switch carried by the electrode slide block, the proximity switch activating a welding current pulse to the electrode.

10. A spot welding assembly according to claim 8 wherein means are provided to limit the stroke of the feed slide block, the means including a threaded bolt carried by the feed slide block projecting therefrom, the threaded bolt having an adjustable nut thereon, adjustment of the nut controlling limitation of movement of the feed slide block.

11. A spot welding assembly according to claim 1 wherein said slides include ball cages and stop plates are provided to return said ball cages to an initial position upon return of the feed and electrode blocks to an initial position.

* * * * *